Dec. 14, 1926.

R. CARLSTEDT 1,610,422

AUTOMATIC CONTROLLING MEANS

Filed May 24, 1922    4 Sheets-Sheet 2

Inventor
R. Carlstedt

Dec. 14, 1926.
R. CARLSTEDT
AUTOMATIC CONTROLLING MEANS
Filed May 24, 1922      4 Sheets-Sheet 3

1,610,422

Inventor:
R. Carlstedt
by
Attys

Dec. 14, 1926.
R. CARLSTEDT
1,610,422
AUTOMATIC CONTROLLING MEANS
Filed May 24, 1922
4 Sheets-Sheet 4

Inventor:
R. Carlstedt
by Marks Clark
Attys.

Patented Dec. 14, 1926.

1,610,422

UNITED STATES PATENT OFFICE.

RAGNAR CARLSTEDT, OF STOCKHOLM, SWEDEN, ASSIGNOR, BY MESNE ASSIGNMENTS, TO ARCA REGULATORS, INCORPORATED, A CORPORATION OF VIRGINIA.

AUTOMATIC CONTROLLING MEANS.

Application filed May 24, 1922. Serial No. 563,458, and in Sweden May 27, 1920.

Automatic means for controlling valves, cocks, rheostats and other common regulating members of industrial plants are generally adapted to maintain a certain constant state within any part of the plant. In such controlling means there is generally used a so-called relay, that is to say, a member the object of which is to transform the slightest changes of pressure, temperature and the like into reliable adjusting powers to adjust the main regulating member. In such cases hydraulic auxiliary power is generally used, the relay actuating a slide or similar member which brings a cylinder having a piston into and out of connection with hydraulic pressure. Consequently such a controlling system contains the following main members:

1. The relay which is adjusted by the variations in the system to be regulated;
2. The slide which is regulated by the relay and on account thereof opens or shuts off the inlet and outlet respectively for pressure liquid to
3. The auxiliary cylinder which adjusts the main regulating member (the valve, the cock, the rheostat or other regulating member).

The object of this invention is to improve such a controlling system in such manner that not only one certain state within any part of the plant may be able to determine the controlling operation but so that also other states or circumstances within other parts of the plant shall be able to operate at the same time, if this be required by the task of controlling.

If for instance it be the question of controlling a reducing valve in a steam plant, it is generally required that the pressure in the low pressure conduit be kept constant, the relay then being connected with this low pressure conduit and adjusted to the normal pressure desired in said conduit. In certain cases it may however be desirable that the reducing valve shall open or shut off at certain limit amounts of the pressure in the high pressure or the low pressure conduit, and in this case the mechanism has consequently to react also on the steam pressure in said conduit or conduits.

Such a combined controlling operation in which several factors are able to influence simultaneously the regulation of a certain member is attained according to this invention by inserting in any suitable manner in the system together with the main relay one or more additional relays which are connected with such parts of the plant as are intended to contribute to the result of the control, and by constructing the slide so as to be able to co-operate with said additional relays.

In the accompanying drawing, wherein an approved embodiment of the invention is illustrated, Figure 1 illustrates diagrammatically an embodiment of the invention for controlling a reducing valve of a steam conduit in which the controlling mechanisms for the rest are constructed in accordance with the so-called arca-system;

Figure 1:
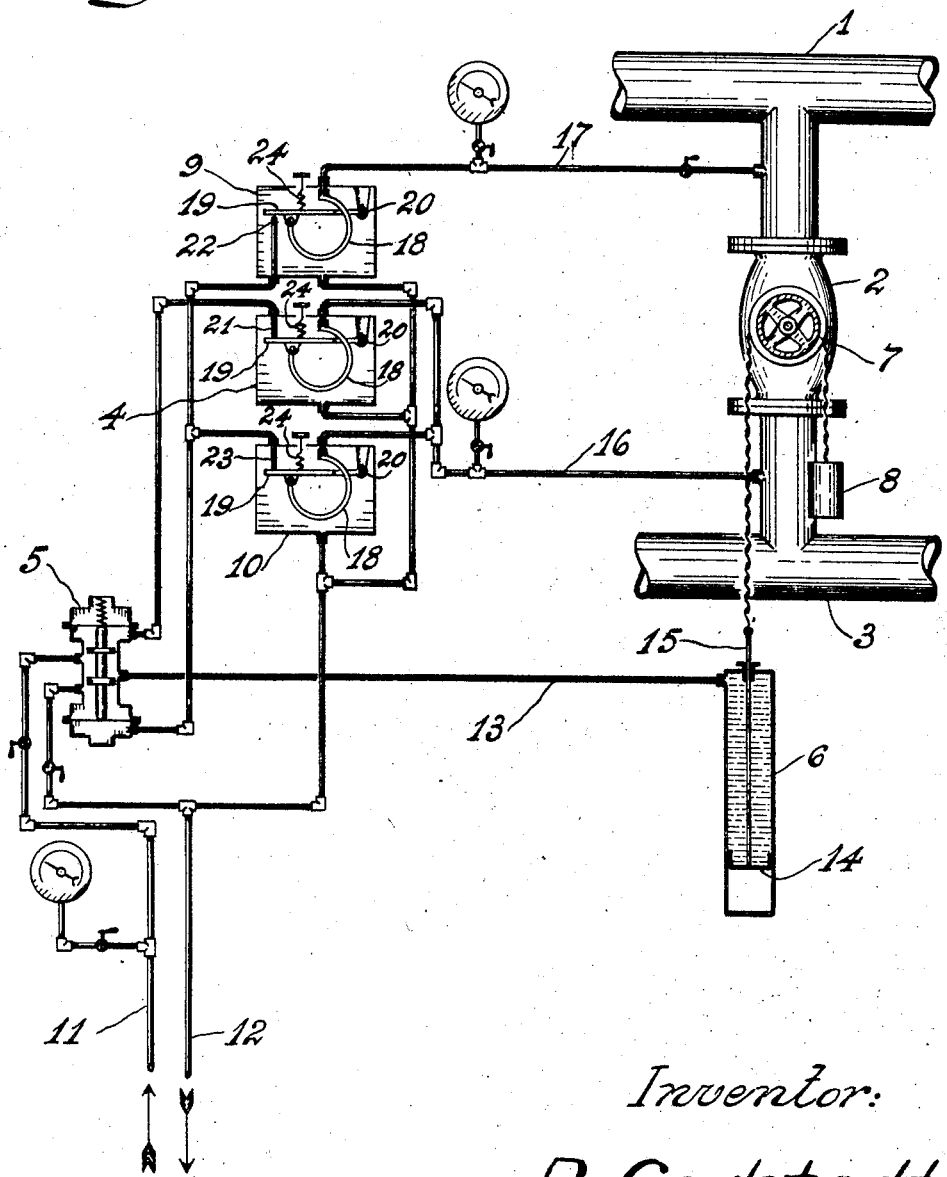

In Figure 1, the numeral 1 designates the high pressure steam conduit, 2 the reducing valve, 3 the low pressure steam conduit, 4 the main relay regulating the pressure in the low pressure conduit, 5 the diaphragm slide regulating the inlet and outlet of pressure liquid of the servo-motor 6 (a hydraulic cylinder having a piston), 7 a sprocket wheel attached to the spindle of the steam reducing valve, 8 a counter-weight actuating the reducing valve in a direction contrary to the hydraulic power and surmounting the weight of the piston and the quantity of water contained in the cylinder. 9 is an additional relay connected with the high pressure steam conduit, 10 a third relay connected with the low pressure steam conduit. 11 is the pressure conduit, 12 the outlet conduit of the pressure liquid and 13 the piping connecting the slide 5 with the pressure cylinder 6. The piston of the pressure cylinder is designated by 14 and the piston rod with 15, the latter being connected with the counter-weight by a chain passing round the sprocket wheel 7. The pipe connecting the low pressure conduit and the relays 4 and 10 is designated by 16 and the corresponding connection between the high pressure conduit and the relay 9 by 17. Said relays consist of Bourdon-pipes 18 fixed in the relay casing, the other end of the pipes being movably connected to a lever 19 movable on an edge 20 and provided with a plate which more or less checks the outflow of water from the pipe outlets 21, 22 and 23, the operation of which will be described below. The Bourdon-springs are besides strained by the spring 24 which is regulated by a small hand-screw.

Figure 2:
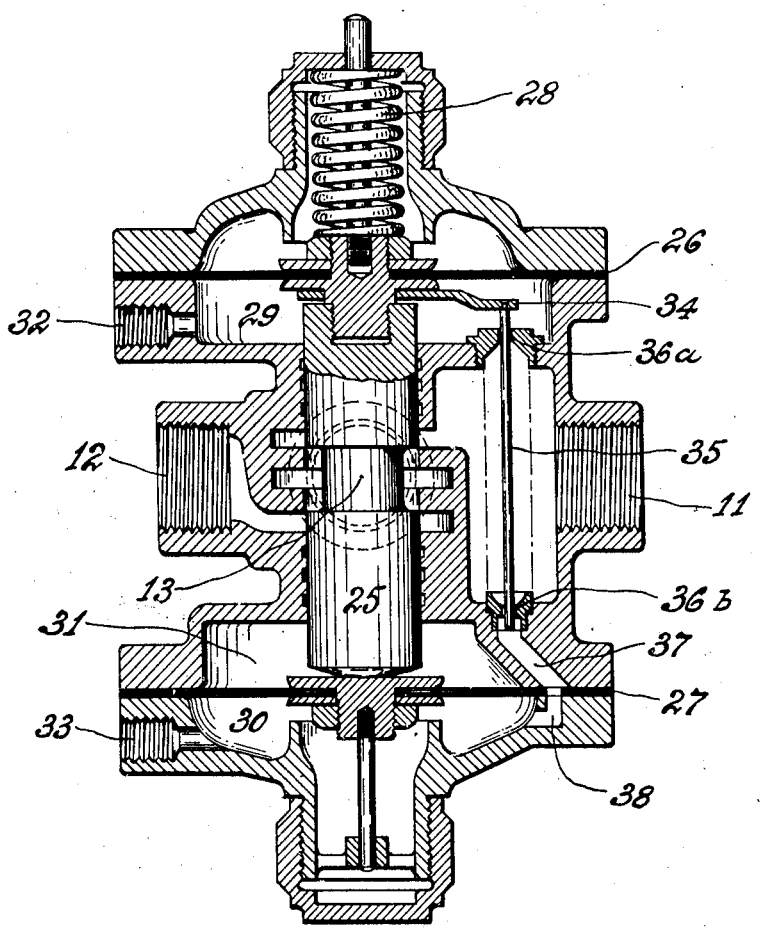
Fig. 2 is an enlarged sectional view of the diaphragm valve shown diagrammatically in Fig. 1.

The diaphragm valve 5 is shown in section in Fig. 2. The slide 25 is attached by means of nuts to the diaphragm 26 and actuated from above by the coiled spring 28. The diaphragm is illustrated in its middle position and secured to the flange of the valve casing by means of a cover and screws. In the same manner the diaphragm 27 is secured to the lower flange of the valve casing; the slide 25 need not however be secured to this diaphragm but may bear freely against the same. The connections of the pressure conduit, the outlet conduit and the piping leading to the servo-motor are designated by 11, 12 and 13 respectively, said connections communicating in usual manner with annular channels in the guide of the slide. In the middle position of the diaphragm the slide shuts off the channels of the water inlet 11 as well as of the outlet 12; when sliding upwards the servo-motor will however be connected with the pressure conduit and when sliding downwards with the outlet conduit. From the pressure conduit 11 pressure water forces its way through the contracted openings 36$^a$ and 36$^b$ of the pressure chambers 29 and 30 respectively and actuates by pressure the diaphragms 26 and 27 respectively. A rod 34 secured to the slide 25 supports a needle 35 which on the movement of the slide cleans the openings 36$^a$ and 36$^b$. Connection between the opening 36$^b$ and the chamber 30 is effected through the channels 37 and 38 bored in the valve casing and the cover. The chamber 29 communicates through the connection 32 and the corresponding pipe with the relay 4 (Fig. 1) and ends in the nozzle 21. In similar manner the chamber 30 communicates through the connection 33 and the corresponding pipe with the relays 9 and 10 (Fig. 1) and ends in the nozzles 22 and 23, the orifices 21 and 23 being opened upon increased steam pressure in the Bourdon-pipe and throttled upon decreased steam pressure, whereas the orifice 22 is influenced to the contrary by the steam pressure.

As will appear from the drawing, the steam and water conduits are provided with manometers and cut off valves, and the relay casings are connected with the water outlet conduit 12 so as to allow the waste water to run off.

The device operates as follows:

On normal operation the steam pressure in the high pressure steam conduit is for instance 12 atmospheres while in the low pressure steam conduit a normal pressure of about 5 atmospheres is desired. By means of the spring 24 the relay 4 is adjusted to 5 atmospheres, the Bourdon-spring consequently commencing at a higher pressure to pull the lever 19 downwards so as to increase the distance between the plate of the lever and the orifice 21. Therefore the water in the conduit 32 runs off more easily with the result that the hydraulic pressure in the chamber 29 is decreased. If by suitable straining of the spring 28 the slide has assumed its middle position at a pressure of 5 atmospheres in the low pressure conduit, the slide will be moved a little downwards by the tension of the spring and open the water outlet thus connecting the latter with said outlet, the counter-weight 8 thereby actuating the reducing valve 2 so as to cause the same to throttle a little the admission of steam from the high pressure conduit. If on the other hand the pressure in the low pressure conduit is falling below 5 atmospheres, the tension of the Bourdon-spring decreases, the lever 19 approaches the orifice 21, the outflow is checked and the pressure in the chamber 29 increases a little, the diaphragm 26 then moving the slide 25 upwards. After the slide has moved a sufficient distance, the outlet 12 is closed and the inlet 11 opened, the pressure liquid flowing to the auxiliary cylinder 6 and moving its piston downwards, so as to cause the reducing valve 2 to open again, that is to say, the steam pressure in the low pressure conduit will increase.

At a pressure of 5 atmospheres the relay 4 will assume a position of equilibrium and no adjustment of the mechanisms will take place.

If however the pressure in the high pressure conduit exceeds a certain maximum, for instance 14 atmospheres, for which pressure the tension of the spring 24 in the relay 9 is supposed to be adjusted, said relay will throttle the orifice 22 of the pipe 33, the pressure in the chamber 30 thus being increased, and the diaphragm 27 will move the slide 25, so as to bring the auxiliary cylinder 6 into connection with the pressure conduit 11 thus increasing the supply of the reducing valve 2. It is true that the pressure in the low pressure conduit will now be raised above 5 atmospheres, and the relay 4 is consequently caused to open the outlet 21, but though the pressure in the chamber 29 is falling, the slide 25 cannot move back because of the diaphragm 27 preventing its backwards movement.

If the relay 10 be adjusted for instance to a pressure of 6 atmospheres, the relay 10 must however, in case of the steam pressure in the low pressure conduit exceeding this pressure, open the orifice 23 and the pressure in the chamber 30 must decrease, so that the diaphragm 27 yields to the tension of the spring 28. The slide 25 then shuts off the supply of water and brings the cylinder 6 into connection with the outlet pipe 12, the reducing valve 2 consequently being influenced so as to throttle the steam supply.

The two relays co-operate consequently in such manner that at steam pressures of 5 to 14 atmospheres in the high pressure conduit the pressure in the low pressure conduit remains at 5 atmospheres. At higher pressures than 14 atmospheres in the high pressure conduit the pressure in the low pressure conduit increases at most to 6 atmospheres.

Figure 3:
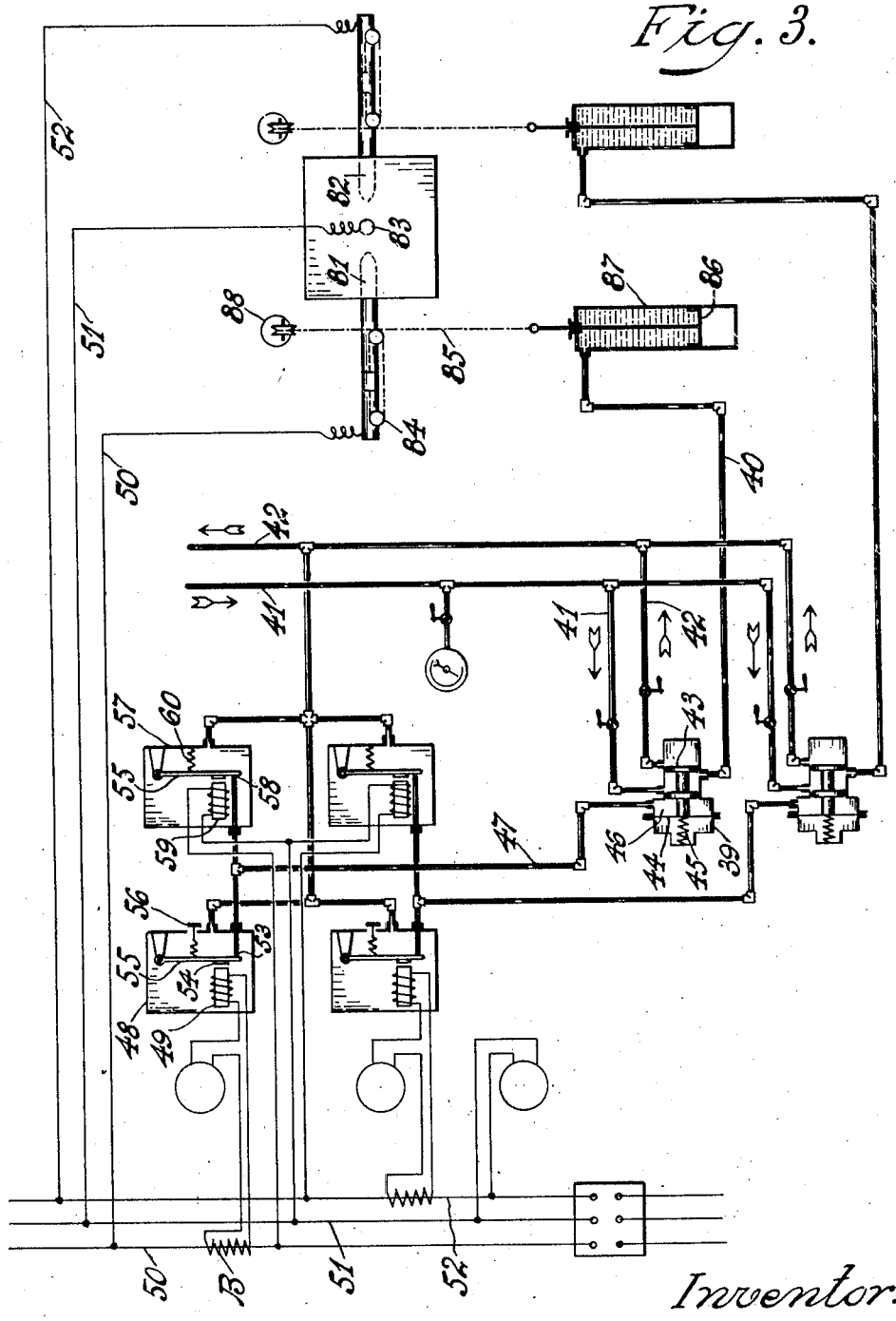
Fig. 3 is a diagram of a further embodiment of the invention adapted to regulate the electrodes of an electric melting furnace.

An embodiment of the invention adapted to regulate the electrodes of an electric melting furnace is illustrated diagrammatically in Fig. 3.

The furnace is provided with three electrodes 81, 82 and 83, two of which 81 and 82 being adjustable by means of identical mechanisms, and owing thereto only the adjustment of one of these electrodes need be described for elucidating the manner of operation of the whole device.

In the drawing the electrode 81 is provided with an adjusting mechanism consisting of pulley blocks 84, a chain 85, the piston 86 in the servo-motor 87 and the counter-weight 88 which as usual pulls the electrode outwards, when the pressure cylinder is brought into connection with the water outlet. The diaphragm valve 39 is connected by means of the pipe 40 with the servo-motor and by means of the pipes 41 and 42 with the supply conduit of the pressure water and the outlet. The slide 43 is attached to the diaphragm 44 and shuts off in its middle position the inlet as well as the outlet. At the one side the diaphragm is actuated by the coiled spring 45 and at the other side by the pressure of the water in the chamber 46 into which the water forces its way through a contracted opening just as in the valve described above. The valve chamber 46 is connected through the pipe 47 with the relay 48, an electric relay, the electromagnet 49 of which is actuated by a current transformer B inserted in the wire 50 conducting the current to the electrode 31. The lever 55 of the relay is swingable as usually about an edge and strained, as wanted, by means of the spring and the screw 56, said lever staunching by the aid of its plate more or less the water jet from the nozzle 53 of the pipe 47. Attached to the lever 55 is an armature 54 which according to the power of the electromagnet 49 moves the lever towards or from the nozzle 53.

Furthermore an extra relay 57 of a construction identical with that described above is provided, but the nozzle 58 also forming an outlet of the pipe 47 is so located that the lever 55 of this relay shuts off the orifice when attracted by the electromagnet 59 which is shunted to the wires 50 and 51.

The device operates as follows: The relay 48 is adjusted by means of the screw 56 to the maximum strength of current to be transmitted between the electrodes 81 and 83. If the resistance between these electrodes be increased by consumption of the carbon 81, the strength of current in the wire 50 decreases causing a decrease of electromagnetic force in the relay 48, the lever 55 of which approaches the nozzle 53 owing to the tension of spring 56. Consequently the pressure in the conduit 47 and the chamber 46 is increased, the diaphragm 44 thereby being bent outwards and the slide 43 so adjusted that the pressure cylinder 87 is brought into connection with the inlet, that is to say, the piston 86 moves downwards and the carbon 81 is moved farther into the furnace by the chain 85 and the pulley blocks 84. On account thereof the distance between 81 and 83 is decreased, the resistance is also decreased and the strength of current transmitted between said electrodes is increased accordingly. As the strength reaches the maximum to which the relay 48 is adjusted, the members assume anew their position of equilibrium. If the strength of current exceeds this amount, the electromagnetic force of the electromagnet is further increased, the distance from the lever 55 to the orifice 53 then being so great that the pressure in the conduit 47 falls below the normal one. Owing thereto the spring 45 surmounts the counter-pressure in the chamber 46, the slide thus being moved inwards and bringing the cylinder 87 into connection with the outlet 42, that is to say, the counter-weight 88 surmounts the pressure acting on the piston 86 and pulls the carbon 81 outwards to a distance corresponding to the normal strength of current.

The relay 57 is supposed to be strained by means of the spring 60 to a certain minimum tension in the wires 50 and 51, for instance to the half of the normal tension, and as long as the tension is high, the electromagnet 59 attracts consequently the lever of the relay towards the nozzle 58, that is to say, closes as far as possible this outlet for the water in the conduit 47, the pressure in this conduit thus depending only upon the relay 48, as described above. If however the tension in the electric conduit decreases sufficiently, so as to cause the relay 48 to close the orifice 53, or in other words, if the pressure in 47 increases and the carbon 81 approaches the electrode 83, the relay 57 will be brought into operation because of the electromagnetic power in 59 being decreased to such an extent that the lever together with the armature is moved outwards by the spring 60 that is to say opens the orifice 58, so that the water is able to flow this way out of the conduit 47 and the adjusting mechanism is actuated in such manner that the carbon 81 is moved outwards. This is to be desired in order that at low tension and at interruption of the current the carbons shall not be moved close to each other but instead thereof be separated. Consequently by means of the relay 57 it will be possible that at zero voltage, that is to say, in the initial position the electrodes are pulled out as far as possible, the relay serving consequently as a zero voltage relay preventing short-circuit at renewed switching on.

In the same manner the electrode 82 is controlled by a normal relay and a zero voltage relay actuating a diaphragm slide, a pressure cylinder and an adjusting mechanism, as shown in the drawing.

As will appear from the above mentioned, the diaphragm slide need only be provided with a diaphragm upon the co-operation of two relays for combined action of different states of the electric current.

Figure 4:
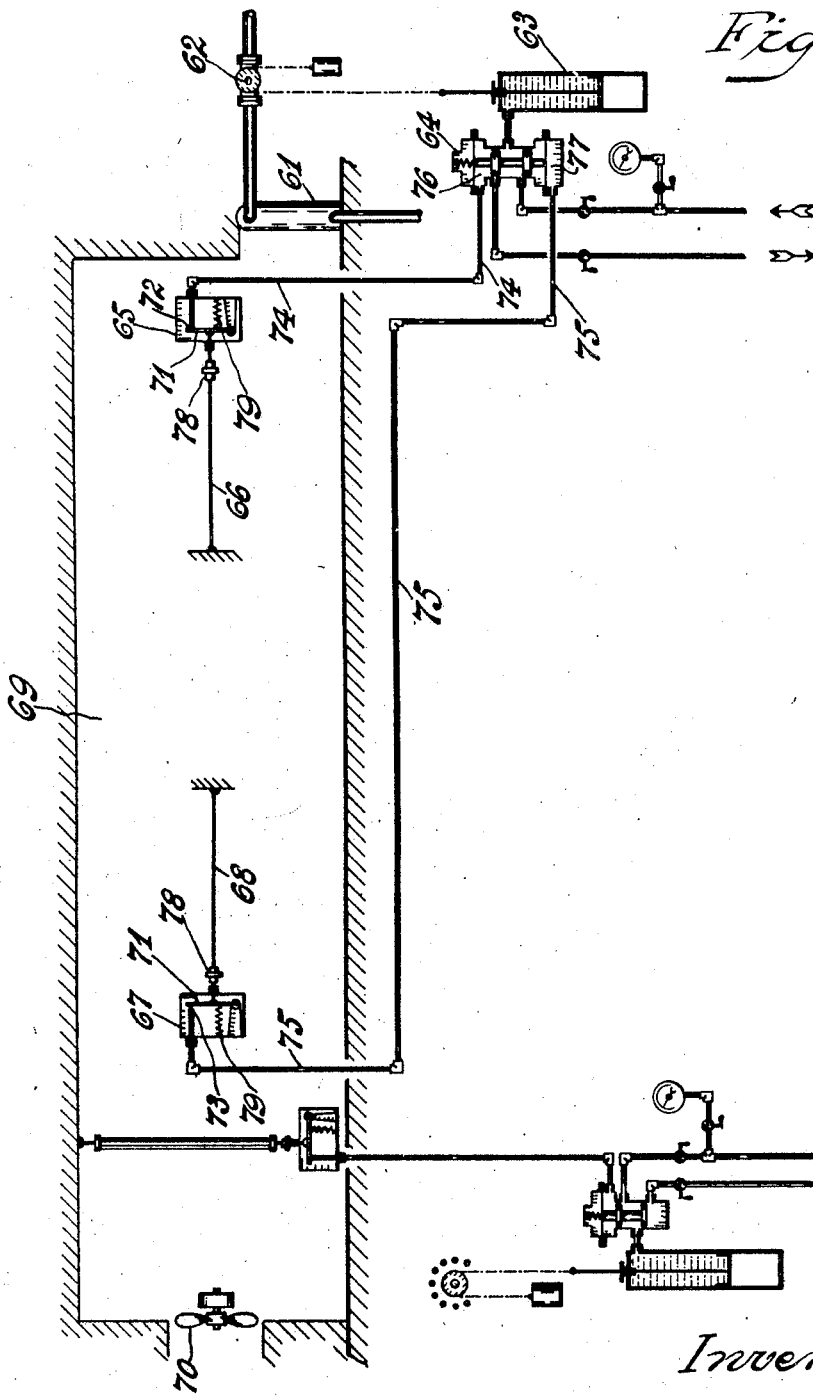
Fig. 4 is a diagram of a third embodiment of the invention.

A third embodiment of combined control by means of two relays is illustrated diagrammatically in Fig. 4 showing an extended furnace for drying wooden goods. The drying chamber 69 is provided with two thermo-relays 65 and 67 placed at the fore and the rear end of the chamber, said relays coacting with a double diaphragm valve 64 of the same construction as that shown in Fig. 2 and controlling in the usual manner the inlet and outlet of water of a servomotor 63 regulating a steam reducing valve 62 which controls the admission of steam to a heating element 61 placed in the air inlet of the chamber. Provided at the opposite end is an electric fan 70 controlled by a common area-regulator which is regulated by a moisture-relay shown in the drawing but the operation of which does not relate to this invention and therefore is not particularly described below. The thermo-relays 65 and 67 are actuated by the wires 66 and 68 the length of which may be regulated by means of a screw 78 and the one end of which is attached to the lever 71 of the relays, the other end being secured to any suitable fixed point. The levers are as usual movable on edges and strained in the direction opposite to the wires by the coiled spring 79. By means of a cup-shaped plate at the end of the levers the outflow of water from the nozzles 72 and 73 of the conduits 74 and 75 respectively is checked more or less, said conduits being connected with diaphragm chambers 76 and 77 respectively. The wooden goods to be dried are introduced into the furnace on carriages moving from the end of the chamber where the fan is located contrary to the current of air that is to say towards the heating element 61.

Supposing the thermo-relay 67 to be adjusted for instance to a temperature of 20° centigrade and the temperature about the wire 68 to exceed 20° centigrade, the wire is extended so far that the outlet 73 is checked and the pressure in the conduit 75 or the chamber 77 is increased, the slide being moved upwards and the pressure cylinder connected with the outlet, the counter-weight then actuating the steam valve 62 so as to throttle the admission of steam to the heating element, thus supplying less quantity of heat to the air current. In the same manner the thermo-relay 65 is operating, said relay however being supposed to be adjusted for instance to 30° centigrade. Consequently, the result of the operation of both relays will be that the temperature at the fore end of the furnace can reach at most 20° centigrade and at the rear end at most 30° centigrade. A position of equilibrium will thus be attained at an increase of the temperature in the chamber up to certain limits intended to prevent superheating of the wood and to economize the heat of the steam.

As will appear from the above, the invention may be suited for various needs of adjusting steam pressure, temperature, electricity and other fluids or forces, the problem consisting in making the adjustment depending upon certain states in one place or several places of the plant. The invention may be varied in several manners by combining two, three or more relays according to the number of factors influencing the adjustment and co-acting with one or more diaphragms according to the nature of the adjustment. The possibility of providing extra relays adapted to effect cutting out at certain limit values and consequently serving as safety devices against too high pressures, tensions, temperatures etc. is of particular importance, such devices being required to a very great extent in automatic controlling means.

What I claim as new and desire to secure by Letters Patent of the United States of America is:—

1. In combination, a conduit, a valve in said conduit, a servo-motor operable to adjust the valve, a slide operable to regulate said servo-motor, a relay responsive to the pressure in the conduit in front of the valve, a plurality of relays responsive to the pressure in said conduit behind said valve, a plurality of pressure chambers associated with said slide so that changes of pressure in the chambers actuate the slide, a connection between one of said chambers and one of the relays responsive to the pressure behind the valve and a connection between a second of said chambers and both a relay responsive to the pressure in front of the valve and a relay responsive to the pressure behind the valve.

2. In combination, a conduit, a valve in said conduit, a liquid pressure operated servo-motor adapted to control the position of the valve, a slide operable to regulate said servo-motor and connected with a source of liquid under pressure, a first relay, a connection between said first relay and the conduit in front of said valve, a second relay, a third relay, a connection between said second relay and said conduit behind said valve, a connection between said third relay and said conduit behind said valve, a plurality of pressure chambers associated with said slide and so arranged that changes in pressure in the chambers actuate the slide, means to conduct a continuous stream of liquid from one of said chambers to said second relay, means to conduct a continuous stream of liquid from another of said chambers to said first relay, means to conduct a continuous stream of liquid from the last mentioned chamber to said third relay, a movable element in said first relay adapted to decrease the flow of liquid into said relay upon rise of pressure in said conduit, a movable element in said second relay adapted to increase the flow of liquid into said relay upon rise of pressure in said conduit and a movable element in said third relay adapted to increase the flow into said relay upon rise of pressure.

3. In combination, a conduit, a valve in said conduit, a liquid pressure operated servo-motor adapted to regulate the position of said valve, a slide operable to regulate said servo-motor, pressure chambers associated with said slide and so arranged that changes of pressure in the chambers actuate the slide, a relay responsive to changes in pressure in said conduit in front of said valve, two relays responsive to changes of pressure in said conduit behind said valve, means to conduct continuous streams of liquid from said chambers to said relays and means in said relays to control said streams.

4. The combination with a sensitive relay reacting in response to variations in a system to be controlled, a main regulating member operable to regulate the system, a servo-motor operable to adjust the main regulating member, and a second regulating member actuated by said relay and adapted for connection with a supply of hydraulic power, said second member regulating the connection between the supply of hydraulic power and the servo-motor, of an additional relay associated with the second regulating member whereby to control the regulating operation according to varying conditions of a part of the system, said second regulating member including a piston slide and an actuating diaphragm control influenced by hydraulic power regulated by the second regulating member.

5. A controlling means as claimed in claim 1 characterized in that the second regulating member includes a piston slide and an actuating diaphragm control influenced by hydraulic power regulated by the second regulating member.

6. The combination with a sensitive relay reacting in response to variations in a system to be controlled, a main regulating member operable to regulate the system, a servo-motor operable to adjust the main regulating member, and a second regulating member actuated by said relay and adapted for connection with a supply of hydraulic power, said second regulating member regulating the connection between the supply of hydraulic power and the servo-motor; of a plurality of additional relays associated with the second regulating member whereby to control the regulating operation according to varying conditions of the system.

7. A controlling means as claimed in claim 6 characterized in that the additional relays constitute safety relays controlling the servo-motor in accordance with predetermined limit values of the variations in the system to be controlled.

8. Relay apparatus for regulators comprising a conduit adapted to contain a continuously flowing stream of liquid, a plurality of outlets for said conduit, a plurality of arms, one controlling each of said outlets and automatic means to control said arms in response to that which is to be controlled.

9. Relay apparatus for regulators comprising a conduit adapted to contain a continuously flowing stream of liquid, a plurality of outlets for said conduit, a plurality of arms, one controlling each of said outlets and pressure operated means to control said arms.

10. A regulator comprising a main regulating member, a liquid pressure servo-motor to control said main regulating member, a slide operable to regulate said servo-motor and connected with a source of liquid under pressure, a conduit leading from said slide having a plurality of outlets and independently operating means to control said outlets in response to that which is to be controlled.

11. Relay apparatus for regulators comprising a conduit adapted to contain a continuously flowing stream of liquid, a plurality of outlets for said conduit and an automatically controlled movable part for controlling each of said outlets.

In testimony whereof I affix my signature.

RAGNAR CARLSTEDT.